(12) United States Patent
Shah et al.

(10) Patent No.: US 8,264,966 B1
(45) Date of Patent: Sep. 11, 2012

(54) OVERLOAD MANAGEMENT ON BACKHAUL LINKS BASED ON PACKET LOSS ON RF LINKS

(75) Inventors: Maulik K. Shah, Overland Park, KS (US); Sachin R. Vargantwar, Overland Park, KS (US); Bhagwan Singh Khanka, Lenexa, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 294 days.

(21) Appl. No.: 12/554,268

(22) Filed: Sep. 4, 2009

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/237; 370/229; 370/230; 370/235; 455/445; 455/515

(58) Field of Classification Search .................. 370/235, 370/237, 229, 230; 455/445, 515
See application file for complete search history.

(56) References Cited

U.S. PATENT DOCUMENTS

| 5,231,633 | A  | * | 7/1993  | Hluchyj et al. | 370/429   |
|-----------|----|---|---------|----------------|-----------|
| 6,078,564 | A  | * | 6/2000  | Lakshman et al.| 370/235   |
| 6,377,548 | B1 | * | 4/2002  | Chuah          | 370/233   |
| 6,510,135 | B1 | * | 1/2003  | Almulhem et al.| 370/229   |
| 6,687,503 | B1 | * | 2/2004  | Porter et al.  | 455/452.1 |
| 7,796,507 | B2 | * | 9/2010  | Gholmieh et al.| 370/229   |
| 7,826,370 | B1 | * | 11/2010 | Vargantwar et al.| 370/235 |
| 2001/0027106 | A1 | * | 10/2001 | Kito         | 455/453   |
| 2003/0091029 | A1 | * | 5/2003  | Jo et al.    | 370/352   |
| 2004/0047292 | A1 | * | 3/2004  | du Crest et al.| 370/235 |
| 2004/0062214 | A1 | * | 4/2004  | Schnack et al.| 370/315  |
| 2007/0242606 | A1 | * | 10/2007 | Chen          | 370/235  |
| 2007/0265013 | A1 | * | 11/2007 | Labedz        | 455/450  |
| 2008/0076406 | A1 | * | 3/2008  | Chen et al.   | 455/424  |
| 2009/0067333 | A1 | * | 3/2009  | Ergen et al.  | 370/235  |
| 2010/0093307 | A1 | * | 4/2010  | Hui et al.    | 455/404.2 |

* cited by examiner

*Primary Examiner* — Michael Thier
*Assistant Examiner* — Benjamin H Elliott, IV (57) ABSTRACT

An RF communication system comprises RF circuitry, access circuitry, and control circuitry. The RF circuitry receives reverse packets from users over reverse RF links. The access circuitry is operationally coupled to the RF circuitry and transfers the reverse packets over a reverse network link. The control circuitry is operationally coupled to the access circuitry and inhibits the transfer of a set of the reverse packets over the reverse network link in response to a reverse overload condition on the reverse network link. The inhibited set of the reverse packets are from the users having a lowest level of reverse packet loss on the reverse RF links.

18 Claims, 5 Drawing Sheets

OVERLOAD MANAGEMENT ON BACKHAUL LINKS BASED ON PACKET LOSS ON RF LINKS

TECHNICAL BACKGROUND

Users operate wireless communication devices to exchange communication packets with various destinations. These user devices wirelessly exchange the communication packets with base stations over RF links. The base stations exchange the packets with a network gateway over backhaul links. The network gateway exchanges the packets with a communication network for subsequent exchange with the various destinations.

The wireless communication devices and the base stations determine packet loss in both directions on the RF links on a per user basis. The packet loss is typically expressed as a percentage of the packets that are transmitted over the RF links, but that are not received over the RF links. Various conditions cause the packet loss, such as RF interference, low power, or excessive range.

The backhaul links between the base stations and the network gateway may get overloaded. The overload occurs when there are more packets to transfer than the backhaul links can carry. This overload situation may be the result of excessive network demand or some impairment to the backhaul links. In an overload situation, the base stations or the network gateway will drop some of the packets—typically in a random manner.

Overview

An RF communication system comprises RF circuitry, access circuitry, and control circuitry. The RF circuitry receives reverse packets from users over reverse RF links. The access circuitry is operationally coupled to the RF circuitry and transfers the reverse packets over a reverse network link. The control circuitry is operationally coupled to the access circuitry and inhibits the transfer of a set of the reverse packets over the reverse network link in response to a reverse overload condition on the reverse network link. The inhibited set of the reverse packets are received from the users having a lowest level of reverse packet loss on the reverse RF links.

In some examples, the RF communication system also comprises network circuitry that is operationally coupled to a communication network. The network circuitry transfers forward packets over a forward network link and receives the reverse packets over the reverse network link. The access circuitry receives the forward packets over the forward network link. The RF communication circuitry transfers the forward packets to the users over a plurality of forward RF links. The control circuitry is operationally coupled to the network circuitry. The control circuitry inhibits the transfer of a set of the forward packets over the forward network link in response to a forward overload condition on the forward network link. The inhibited set of the forward packets are directed to the users having a lowest level of forward packet loss on the forward RF links.

DETAILED DESCRIPTION

Figure 1:
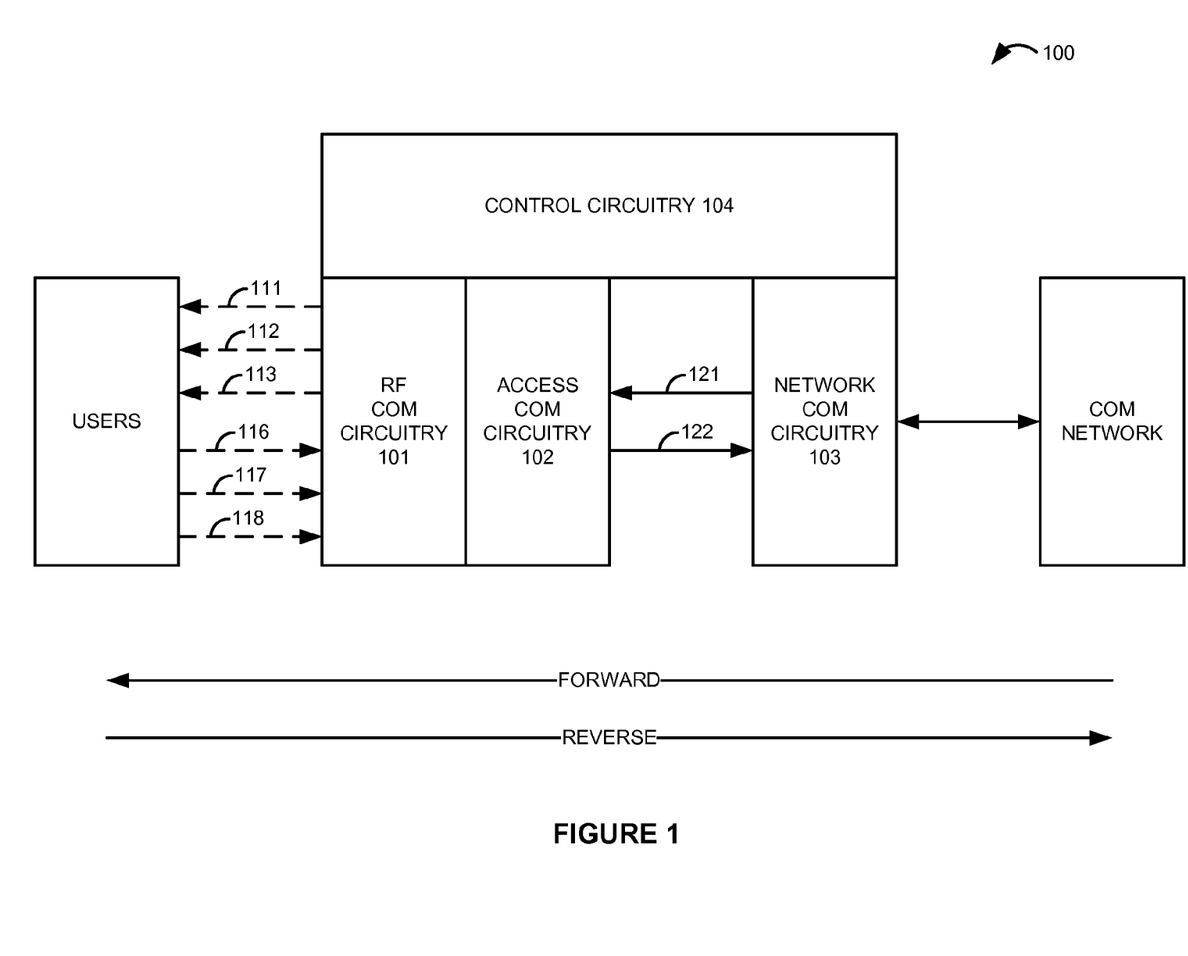
FIG. 1 illustrates an RF communication system.

FIG. 1 illustrates Radio Frequency (RF) communication system 100. RF communication system 100 comprises RF communication circuitry 101, access communication circuitry 102, network communication circuitry 103, and control circuitry 104. RF communication circuitry 101 and access communications circuitry 102 are operationally coupled together. Control circuitry 104 is operationally coupled to RF communication circuitry 101, access communication circuitry 102, and network communication circuitry 103. Network communication circuitry 103 is operationally coupled to a communication network. These operational couplings could be direct communication lines or they may be indirect communication lines that traverse various other devices, systems, and networks.

On FIG. 1, the left-to-right direction from the users to the communication network is the reverse direction. The users operate wireless communication devices to direct communication packets to various destinations. These user devices wirelessly transfer the communication packets in the reverse direction (referred to as "reverse packets") to RF communication circuitry 101 over reverse RF links 116-118. RF communication circuitry 101 transfers the reverse packets to access communication circuitry 102. Access communication circuitry 102 transfers the reverse packets to network communication circuitry 103 over reverse network link 122. Network communication circuitry 103 transfers the reverse packets to the communication network for subsequent delivery to the various destinations.

On FIG. 1, the right-to-left direction from the communication network to the users is the forward direction. The communication network receives communication packets directed to the users from various sources. The communication network transfers the communication packets in the forward direction (referred to as "forward packets") to network communication circuitry 103. Network communication circuitry 103 transfers the forward packets to access communication circuitry 102 over forward network link 121. Access communication circuitry 102 transfers the forward packets to RF communication circuitry 101. RF communication circuitry 101 wirelessly transfers the forward packets to the users over forward RF links 111-113.

RF communication circuitry 101 determines the forward packet loss for each of the users on forward RF links 111-113. RF communication circuitry 101 also determines reverse packet loss for each of the users on reverse RF links 116-118. Typically, RF communication circuitry 101 interacts with the wireless communication devices operated by the users to make these packet loss determinations. For example, RF communication circuitry 101 may determine that user "A" has lost 3% of the forward packets transferred over forward RF link 111 and has lost 1% of the reverse packets transferred over reverse RF link 116. RF communication circuitry 101 indicates the forward packet loss and the reverse packet loss for each of the users to control circuitry 104.

Access communication circuitry 102 determines if a reverse overload condition exists on reverse network link 122. For example, a reverse overload condition may exist when a transmit buffer in circuitry 102 that feeds reverse network link 122 is more than 80% full. Other techniques for determining overload conditions could be used. Access communication circuitry 102 indicates any reverse overload condition on reverse network link 122 to control circuitry 104.

Network communication circuitry 103 determines if a forward overload condition exists on forward network link 121. For example, a forward overload condition may exist when time slots on forward network link 121 exceed an 80% occupancy rate. Other techniques for determining overload conditions could be used. Network communication circuitry 103 indicates any forward overload condition on forward network link 121 to control circuitry 104.

In response to a reverse overload condition on reverse network link 122, control circuitry 104 inhibits the transfer of a set of the reverse packets from the users over reverse network link 122. The inhibited set of the reverse packets are from the users having a lowest level of reverse packet loss on reverse RF links 116-118. For example, if users A, B, and C have respective reverse packet loss of 1%, 2%, and 3%, then user A has the lowest level of reverse packet loss at 1%. Thus, control circuitry 104 would inhibit the transfer of user A reverse packets over reverse network link 122 in an overload condition. If the overload condition persists over time, the reverse packet loss of user A might rise to 2%, while users B and C remain at 2% and 3% respectively. Thus, control circuitry 104 would then inhibit the transfer of reverse packets from both user A and user B over reverse network link 122, since both user A and user B now have the lowest packet loss rate. If the overload condition still persists, the reverse packet loss of user A and user B might rise to 4%, while user C remains at 3%. Thus, control circuitry 104 would then inhibit the transfer of reverse packets from user C over reverse network link 122—while allowing the transfer of reverse packets from user A and user B.

Note that inhibiting the transfer of packets for a user is not typically a total packet block for that user. A packet transfer inhibition typically entails blocking a ratio of the user's packets. For example, an inhibition may be to block $1/25^{th}$, $1/50^{th}$, or $1/100^{th}$ of the user packets. These ratios may grow over time to reduce overloading—for example, from $1/100$ to $1/25$. When the packet loss for a user reaches a threshold, such as 4%, then additional inhibition is typically not performed for that user, and new users are then blocked to avoid more overloading. If the packet loss for a user exceeds a threshold, such as 4%, then the inhibition ratio would typically be lowered for that user to improve their packet loss back down to the threshold.

In response to a forward overload condition on forward network link 121, control circuitry 104 inhibits the transfer of a set of the forward packets over forward network link 121. The inhibited set of the forward packets are to the users having a lowest level of forward packet loss on forward RF links 111-113. For example, if users A, B, and C have respective forward packet loss of 1%, 2%, and 3%, then user A has the lowest level of forward packet loss at 1%. Thus, control circuitry 104 would inhibit the transfer of user A forward packets over forward network link 121 in an overload condition. If the overload condition persists over time, the forward packet loss of user A might rise to 2%, while users B and C remain at 2% and 3% respectively. Thus, control circuitry 104 would then inhibit the transfer of forward packets to both user A and user B over forward network link 121, since both user A and user B now have the lowest packet loss rate. If the overload condition still persists, the forward packet loss of user A and user B might rise to 4%, while user C remains at 3%. Thus, control circuitry 104 would then inhibit the transfer of forward packets to user C over forward network link 121—while allowing the transfer of forward packets to user A and user B.

On FIG. 1, circuitry 101-104 are shown as discrete components, but they could be wholly or partially integrated together. For example, control circuitry 104 could be distributed among communication circuitry 102-103. Likewise, communication circuitry 101-102 could be integrated together.

Also note that the above discussion refers to "communication packets", but the above technique could be applied to a particular type of packet. For example, the technique could be applied to data packets and not to voice packets. The technique could be applied to data packets and voice packets independently using different thresholds. The technique could also be applied to data packets first and then to voice packets if the overload condition persists.

Figure 2:
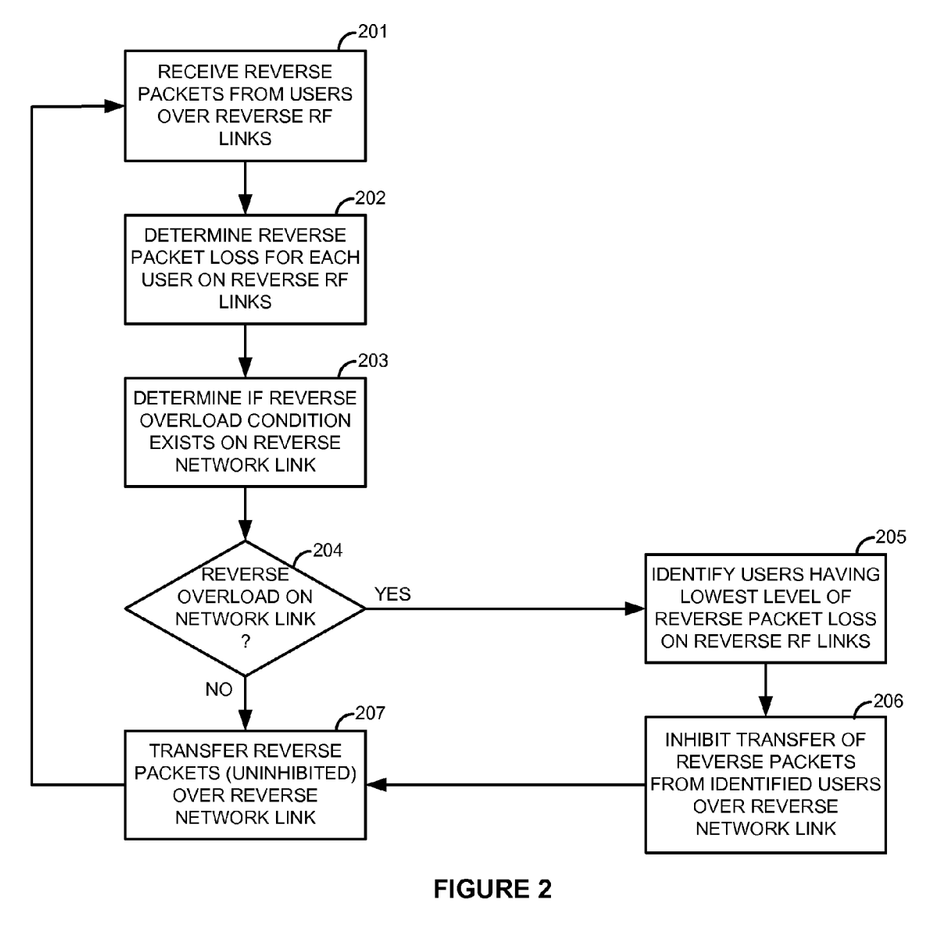
FIG. 2 illustrates the operation of the RF communication system.

FIG. 2 illustrates the operation of RF communication system 100. RF communication circuitry 101 receives reverse packets from the users over reverse RF links 116-118 (201). RF communication circuitry 101 determines reverse packet loss for each of the users on reverse RF links 116-118 and indicates the reverse packet loss for the users to control circuitry 104 (202). Access communication circuitry 102 determines if a reverse overload condition exists on reverse network link 122 and indicates any reverse overload conditions to control circuitry 104 (203). If a reverse overload condition exists on reverse network link 122 (204), then control circuitry 104 identifies the users having the lowest level of reverse packet loss on reverse RF links 116-118 (205). Control circuitry 104 then inhibits the transfer of reverse packets from these identified users over reverse network link 122 (206). Access communication circuitry 102 then transfers the uninhibited reverse packets over reverse network link 122 (207). If there is no reverse overload condition on reverse network link 122 (204), then all reverse packets (none are inhibited) are transferred over reverse network link 122—absent some other transfer restriction. (207).

Figure 3:
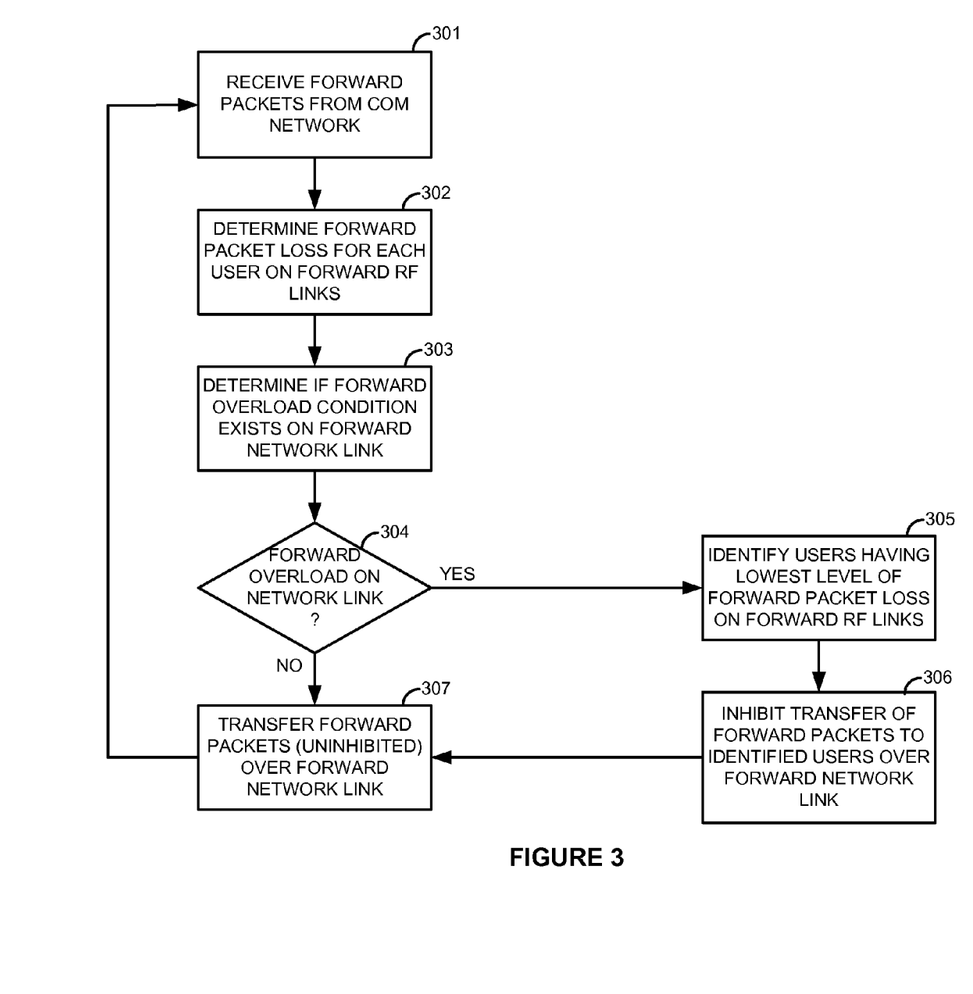
FIG. 3 illustrates the operation of the RF communication system.

FIG. 3 illustrates another operation of RF communication system 100. Network communication circuitry 103 receives forward packets that are directed to the users from the communication network (301). RF communication circuitry 101 determines forward packet loss for each of the users on forward RF links 111-113 and indicates the forward packet loss for the users to control circuitry 104 (302). Network communication circuitry 103 determines if a forward overload condition exists on forward network link 121 and indicates any forward overload conditions to control circuitry 104 (303). If a forward overload condition exists on forward network link 121 (304), then control circuitry 104 identifies the users having the lowest level of forward packet loss on forward RF links 111-113 (305). Control circuitry 104 then inhibits the transfer of forward packets to these identified users over forward network link 121 (306). Network communication circuitry 103 then transfers the uninhibited forward packets over forward network link 121 (307). If there is no forward overload condition on forward network link 121 (304), then all forward packets (none are inhibited) are transferred over forward network link 121—absent some other transfer restriction. (307).

In FIGS. 1-3, the operations are discussed sequentially, but the individual processes typically occur contemporaneously. For example, processes 201-204 and 301-304 may occur in parallel Likewise, after a network link overload is determined (204, 304), there may be a time delay before the inhibition is implemented (206, 306), and some packets that would be inhibited absent the time delay would still be transferred.

Figure 4:
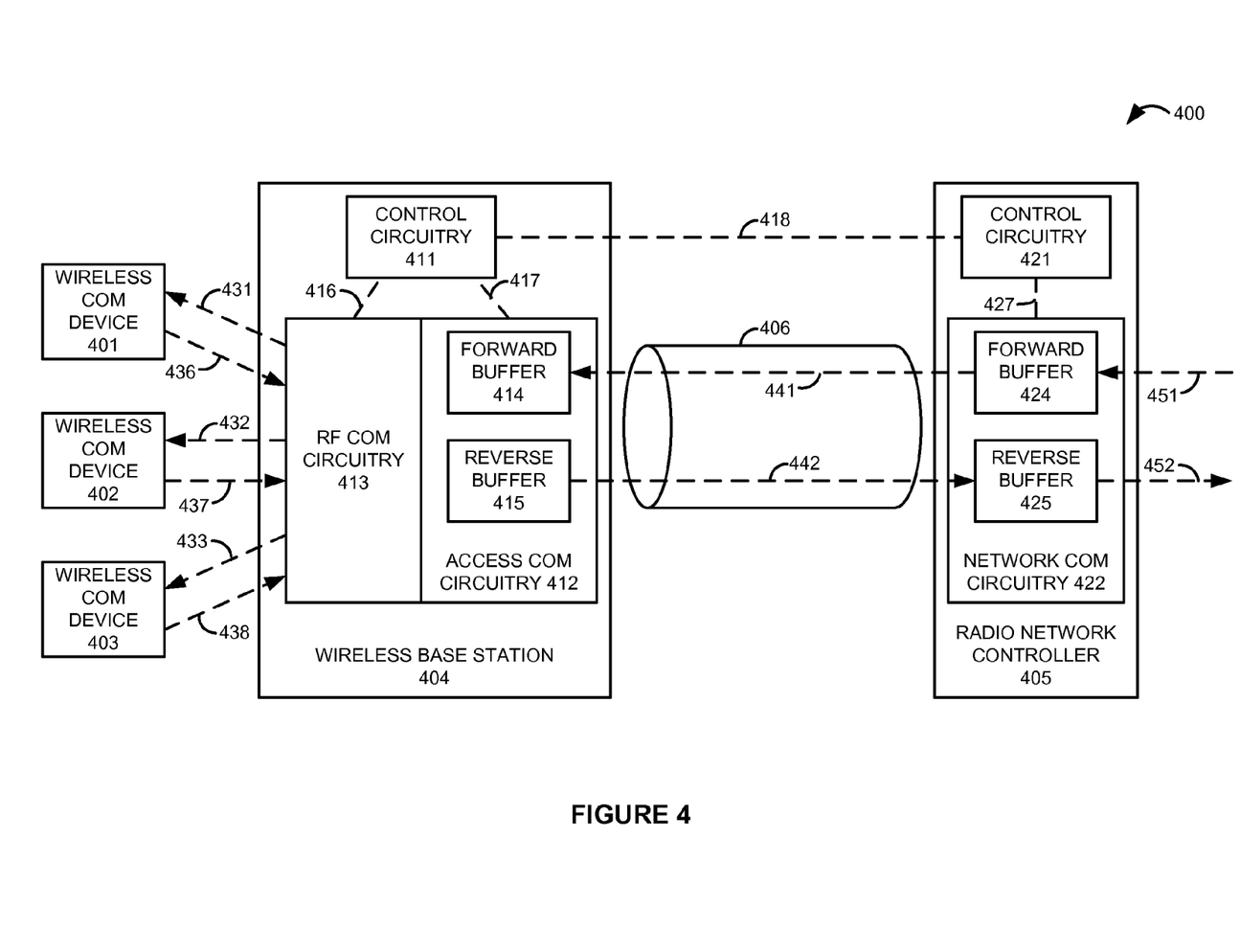
FIG. 4 illustrates an RF communication system and its operation.

FIG. 4 illustrates RF communication system 400. RF communication system 400 comprises user wireless communication devices 401-403, wireless base station 404, radio network controller 405, and backhaul link 406. Wireless base station 404 comprises control circuitry 411, access communication circuitry 412, and RF communication circuitry 413.

Access communication circuitry 412 includes forward buffer 414 and reverse buffer 415. Radio network controller 405 comprises control circuitry 421 and network communication circuitry 422. Network communication circuitry 422 includes forward buffer 424 and reverse buffer 425. Backhaul link 406 includes forward network link 441 and reverse network link 442. Backhaul link 406 could be a T1 link, Ethernet link, or some other type of communication link.

Access communication circuitry 404 and network communication circuitry 405 communicate over backhaul link 406. Forward buffer 424 and forward buffer 414 communicate over forward network link 441. Reverse buffer 415 and reverse buffer 425 communicate over reverse network link 442. Forward buffer 424 communicates with a communication network (not shown) over communication link 451. Reverse buffer 425 communicates with the communication network (not shown) over communication link 452.

RF communication circuitry 413 and wireless communication device 401 communicate wirelessly over forward RF link 431 and reverse RF link 436. RF communication circuitry 413 and wireless communication device 402 communicate wirelessly over forward RF link 432 and reverse RF link 437. RF communication circuitry 413 and wireless communication device 403 communicate wirelessly over forward RF link 433 and reverse RF link 438. RF links 431-433 and 436-438 could be code division multiple access, global system for mobile communication, or some other type of wireless communication links. Control circuitry 411 and RF communication circuitry 413 communicate over control link 416. Control circuitry 411 and access communication circuitry 412 communicate over control link 417. Control circuitry 421 and network communication circuitry 424 communicate over control link 427. Control circuitry 411 and control circuitry 421 communicate over control link 418.

In operation, wireless communication devices 401-403 wirelessly transfer reverse communication packets to RF communication circuitry 413 over respective reverse RF links 436-438. RF communication circuitry 413 transfer the reverse packets to access communication circuitry 412, and access communication circuitry 412 writes the reverse packets to reverse buffer 415. Subsequently, access communication circuitry 412 reads the reverse packets from reverse buffer 415 and transfers the reverse packets to network communication circuitry 422 over reverse network link 442 in backhaul link 406. Network communication circuitry 422 writes the reverse packets to reverse buffer 425. Subsequently, network communication circuitry 422 reads the reverse packets from reverse buffer 425 and transfers the reverse packets over communication link 452 for subsequent delivery.

RF communication circuitry 413 determines the reverse packet loss for each of the user devices 401-403 on reverse RF links 436-438. RF communication circuitry 413 indicates the reverse packet loss for user devices 401-403 to control circuitry 411. Access communication circuitry 412 determines if a reverse overload condition exists on reverse network link 442. For example, a reverse overload condition may exist when reverse buffer 415 is more than 80% full. Access communication circuitry 413 indicates any reverse overload condition on reverse network link 442 to control circuitry 411.

In response to a reverse overload condition on reverse network link 442, control circuitry 411 inhibits the transfer of a set of the reverse packets from user devices 401-403 over reverse network link 442. The inhibited set of the reverse packets are from the user devices 401-403 having a lowest level of reverse packet loss on reverse RF links 436-438. For example, if user devices 401-403 have respective reverse packet loss of 1%, 1%, and 3%, then user devices 401-402 have the lowest level of reverse packet loss at 1%. Thus, control circuitry 411 would inhibit the transfer of reverse packets from user devices 401-402 over reverse network link 442. Inhibiting the transfer of a packet may entail control circuitry 411 instructing access communication circuitry 412 to leave the packet in reverse buffer 415 where it is eventually overwritten.

The communication network transfers forward packets to network communication circuitry 422 over communication link 451. Network communication circuitry 422 writes the forward packets to forward buffer 424. Subsequently, network communication circuitry 424 reads the forward packets from forward buffer 424 and transfers the reverse packets to access communication circuitry 412 over forward network link 441 in backhaul link 406. Access communication circuitry 412 writes the forward packets to forward buffer 414. Subsequently, access communication circuitry 412 reads the forward packets from forward buffer 414 and transfers the forward packets to RF communication circuitry 413. RF communication circuitry 413 wirelessly transfers the forward packets to user wireless communication devices 401-403 over respective forward RF links 431-433.

RF communication circuitry 413 determines the forward packet loss for each of user devices 401-403 on forward RF links 431-433. RF communication circuitry 413 indicates the forward packet loss for user devices 401-403 to control circuitry 411, and control circuitry 411 indicates the forward packet loss for user devices 401-403 to control circuitry 421. Network communication circuitry 422 determines if a forward overload condition exists on forward network link 441. For example, a forward overload condition may exist when forward buffer 424 is more than 80% full. Network communication circuitry 422 indicates any forward overload condition on forward network link 441 to control circuitry 421.

In response to a forward overload condition on forward network link 441, control circuitry 421 inhibits the transfer of a set of the forward packets over forward network link 441. The inhibited set of the forward packets are to user devices 401-403 having a lowest level of forward packet loss on forward RF links 431-433. For example, if user devices 401-403 have respective forward packet loss of 1%, 1%, and 3%, then user devices 401-402 have the lowest level of forward packet loss at 1%. Thus, control circuitry 421 would inhibit the transfer of forward packets to user devices 401-402 over forward network link 441. Inhibiting the transfer of a packet may entail control circuitry 421 instructing network communication circuitry 422 to leave the packet in forward buffer 424 where it is eventually overwritten.

Figure 5:
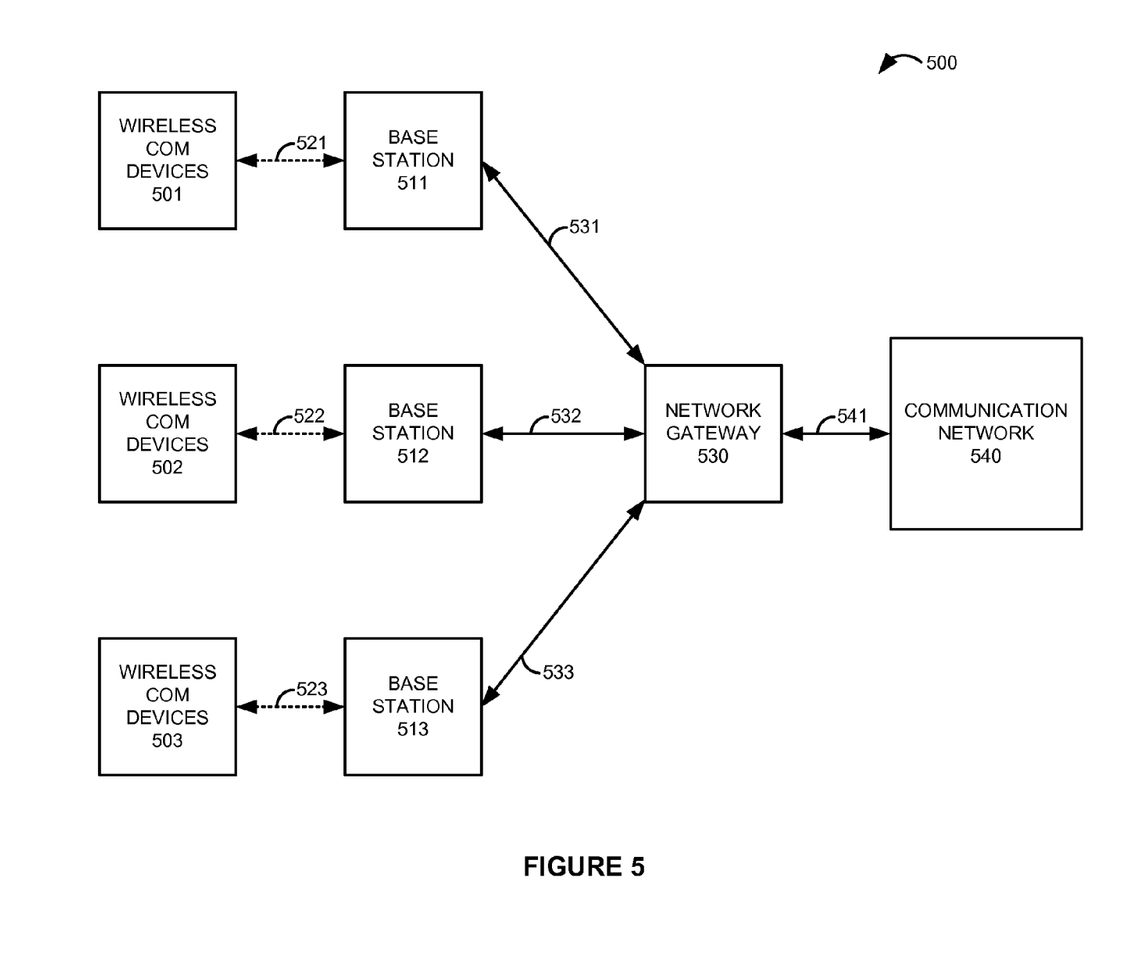
FIG. 5 illustrates an RF communication system and its operation.

FIG. 5 illustrates RF communication system 500. RF communication system 500 comprises wireless communication devices 501-503, base stations 511-513, network gateway 530, and communication network 540. Wireless communication device 501 and base station 511 communicate bi-directionally over wireless links 521, and base station 511 and network gateway 530 communicate bi-directionally over backhaul links 531. Wireless communication device 502 and base station 512 communicate bi-directionally over wireless links 522, and base station 512 and network gateway 530 communicate bi-directionally over backhaul links 532. Wireless communication device 503 and base station 513 communicate bi-directionally over wireless links 523, and base station 513 and network gateway 530 communicate bi-directionally over backhaul links 533. Network gateway 530 and communication network 540 communicate bi-directionally over network links 541. Base stations 511-513 each include RF communication circuitry, access communication circuitry, and control circuitry to inhibit the transfer of reverse packets over backhaul links 531-533 in response to reverse overloading on backhaul links 531-533 and based on reverse packet loss on wireless links 521-523 as described above for FIGS. 1, 2, and 4. Network gateway 530 includes network communication circuitry and control circuitry to inhibit the transfer of forward packets over backhaul links 531-533 in response to forward overloading on backhaul links 531-533 and based on forward packet loss on wireless links 521-523 as described above for FIGS. 1, 3, and 4.

Referring back to FIG. 1, the users operate wireless communication devices that comprise an antenna and RF communication circuitry for wireless communication. The RF communication circuitry typically includes an amplifier, filter, RF modulator, and signal processing circuitry. The wireless communication devices may also comprise processing circuitry, memory, software, and a user interface. RF communication circuitry 101 comprises antennas and RF circuitry for wireless communication. The RF circuitry typically includes an amplifier, filter, RF modulator, and signal processing circuitry. The RF circuitry may also comprise processing circuitry, memory, and software. Access communication circuitry 102 and network communication circuitry 103 comprise processing circuitry, memory, software, and network transceivers. Control circuitry 104 comprises microprocessors, memory, software, and communication interfaces.

RF links 111-113 and 116-118 use the air or space as the transport media. RF links 111-113 and 116-118 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Network links 121-122 use metal, glass, air, space, or some other material as the transport media. Network links 121-122 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Network links 121-122 could be direct links or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A Radio Frequency (RF) communication system comprising:

RF communication circuitry configured to receive reverse packets from a plurality of user devices over a plurality of reverse RF links associated with the user devices and transfer forward packets to the user devices over a plurality of forward RF links associated with the user devices;

access communication circuitry operationally coupled to the RF communication circuitry and configured to transfer the reverse packets over a reverse backhaul link and receive the forward packets over a forward backhaul link;

network communication circuitry operationally coupled to a communication network and configured to transfer the forward packets over the forward backhaul link and to receive the reverse packets over the reverse backhaul link;

control circuitry is operationally coupled to the network communication circuitry and configured to inhibit the transfer of a set of the forward packets over the forward backhaul link in response to a forward overload condition on the forward backhaul link, wherein the inhibited set of the forward packets are directed to ones of the user devices having a lowest level of forward packet loss on the forward RF links; and the control circuitry operationally coupled to the access communication circuitry and configured to inhibit the transfer of a set of the reverse packets over the reverse backhaul link in response to a reverse overload condition on the reverse backhaul link, wherein the inhibited set of the reverse packets are received from ones of the user devices having a lowest level of reverse packet loss on the reverse RF links.

2. The RF communication system of claim 1 wherein the control circuitry is configured to inhibit the transfer of the set of the reverse packets by controlling a reverse buffer in the access communication circuitry and to inhibit the transfer of the set of the forward packets by controlling a forward buffer in the network communication circuitry.

3. The RF communication system of claim 1 wherein the control circuitry is operationally coupled to the RF communication circuitry and the RF communication circuitry is configured to determine the forward packet loss for each of the user devices on the forward RF links and to determine the reverse packet loss for each of the user devices on the reverse RF links.

4. The RF communication system of claim 1 wherein the network communication circuitry is configured to determine if the forward overload condition exists on the forward backhaul link.

5. The RF communication system of claim 1 wherein the access communication circuitry is configured to determine if the reverse overload condition exists on the reverse backhaul link.

6. The RF communication system of claim 1 wherein the forward backhaul link and the reverse backhaul link comprise a backhaul link between the communication network and a base station.

7. The RF communication system of claim 6 wherein the backhaul link comprises T1 links.

8. The RF communication system of claim 6 wherein the backhaul link comprises Ethernet links.

9. The RF communication system of claim 6 wherein the forward and reverse RF links comprise code division multiple access links.

10. A method for operating a Radio Frequency (RF) communication system, the method comprising:

in RF communication circuitry, receiving reverse packets from a plurality of user devices over a plurality of reverse RF links associated with the user devices and transferring forward packets to the user devices over a plurality of forward RF links;

in access communication circuitry, transferring the reverse packets over a reverse backhaul link and receiving the forward packets over a forward backhaul link;

in network communication circuitry, transferring the forward packets over the forward backhaul link and receiving the reverse packets over the reverse backhaul link;

in control circuitry, inhibiting the transfer of a set of the forward packets over the forward backhaul link in response to a forward overload condition on the forward backhaul link, wherein the inhibited set of the forward packets are directed to ones of the user devices having a lowest level of forward packet loss on the forward RF links; and in the control circuitry, inhibiting the transfer of a set of the reverse packets over the reverse backhaul link in response to a reverse overload condition on the reverse backhaul link, wherein the inhibited set of the reverse packets are received from ones of the user devices having a lowest level of reverse packet loss on the reverse RF links.

11. The method of claim 10 wherein inhibiting the transfer of the set of the reverse packets comprises controlling a reverse buffer in the access communication circuitry and controlling a forward buffer in the network communication circuitry.

12. The method of claim 10 further comprising, in the RF communication circuitry, determining the forward packet loss for each of the user devices on the forward RF links and determining the reverse packet loss for each of the user devices on the reverse RF links.

13. The method of claim 10 further comprising, in the network communication circuitry, determining if the forward overload condition exists on the forward backhaul link.

14. The method of claim 10 further comprising, in the access communication circuitry, determining if the reverse overload condition exists on the reverse backhaul link.

15. The method of claim 10 wherein the forward backhaul link and the reverse backhaul link comprise a backhaul link between the communication network and a base station.

16. The method of claim 15 wherein the backhaul link comprises T1 links.

17. The method of claim 15 wherein the backhaul link comprises Ethernet links.

18. The method of claim 15 wherein the forward and reverse RF links comprise code division multiple access links.

* * * * *